Oct. 29, 1963    F. J. JANNETT    3,108,782
TURBINE WHEEL AND METHOD OF MANUFACTURE
Filed March 30, 1961    3 Sheets-Sheet 1
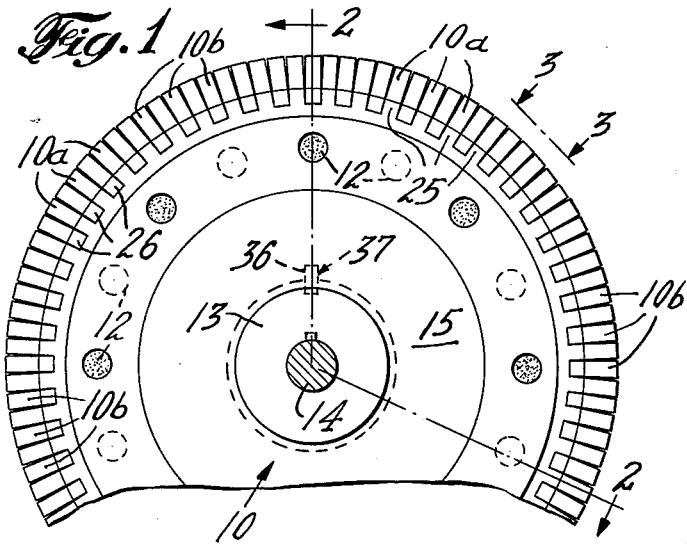
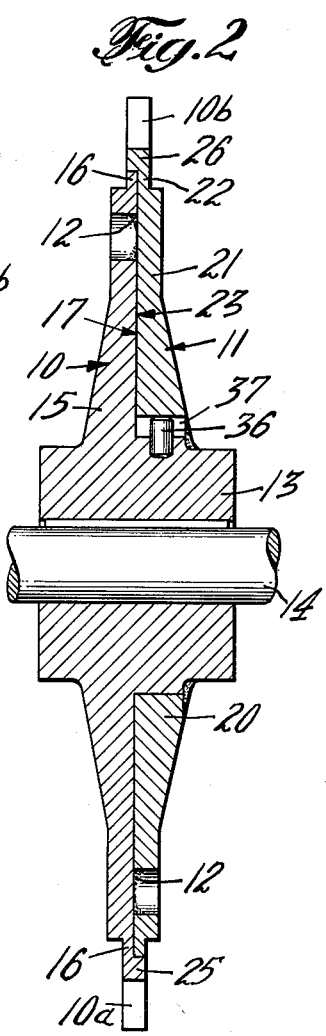
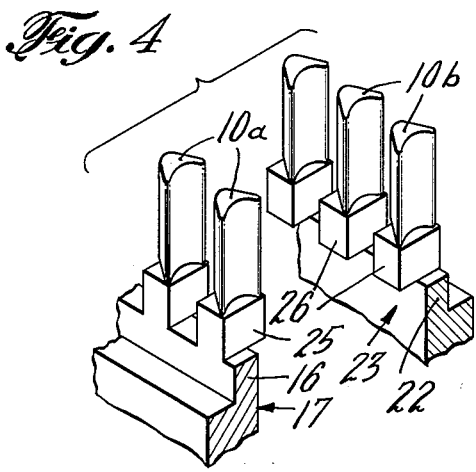
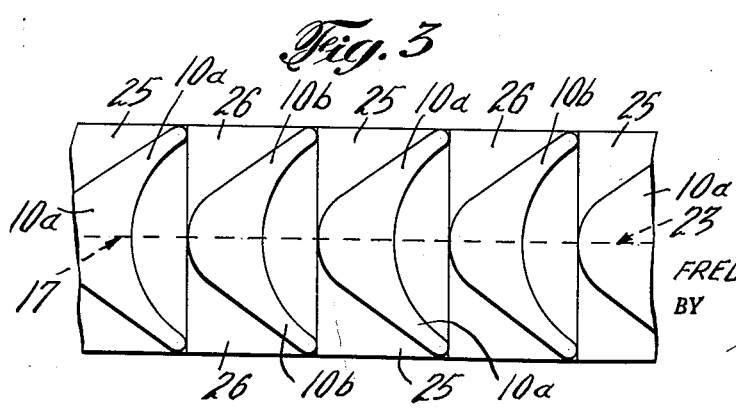
INVENTOR.
FREDERICK J. JANNETT
BY Clyde H. Haynes
George W. Reiber
ATTORNEYS Oct. 29, 1963   F. J. JANNETT   3,108,782
TURBINE WHEEL AND METHOD OF MANUFACTURE
Filed March 30, 1961   3 Sheets-Sheet 2

INVENTOR.
FREDERICK J. JANNETT
BY Clyde H. Haynes
George W. Reiber
ATTORNEYS

Oct. 29, 1963 F. J. JANNETT 3,108,782
TURBINE WHEEL AND METHOD OF MANUFACTURE
Filed March 30, 1961 3 Sheets-Sheet 3

INVENTOR.
FREDERICK J. JANNETT
BY Clyde H. Haynes
George W. Reiber
ATTORNEYS

United States Patent Office 3,108,782
Patented Oct. 29, 1963

3,108,782
TURBINE WHEEL AND METHOD OF MANUFACTURE
Frederick J. Jannett, West Millington, N.J., assignor to American Can Company, New York, N.Y., a corporation of New Jersey
Filed Mar. 30, 1961, Ser. No. 99,459
6 Claims. (Cl. 253—77)

The present invention relates to rotors such as turbine wheels and to the method of manufacturing them.

Various types of turbine wheels have been manufactured in various methods in the past. In some instances turbine wheels have been machined from unitary pieces of material with the blades contoured and curved during the machining operation. In such instances it was found necessary to have the blades spaced sufficiently far apart that the machine tools, cutting knives, grinding wheel, polishers and so forth could easily be manipulated and moved in and about the individual blades during the manufacturing process. This often necessitated spacing the blades further apart than desired. If the blades could have been spaced closer together more blades could have been formed on the wheel.

The present invention is directed to a rotor such as a machined turbine wheel in which the working members or blades are spaced closer together than heretofore possible.

A further object of the present invention is to provide a turbine wheel comprising a pair of annuli arranged face to face and each having blades extending radially outwardly and laterally across the other annulus with the blades disposed alternately.

A further object of the invention is to provide a method of manufacturing the turbine wheel as defined, described and illustrated herein.

Numerous other objects and advantages of the invention will be apparent as it is better understood from the following description, which, taken in connection with the accompanying drawings, discloses a preferred embodiment thereof.

Referring to the drawings:

FIGURE 1 is an elevational view of a turbine wheel incorporating the features of the present invention;

FIG. 2 is an enlarged sectional view taken along approximately the line 2—2 of FIG. 1;

FIG. 3 is a fragmentary enlarged view taken along line 3—3 of FIG. 1;

FIG. 4 is a fragmentary enlarged perspective exploded view illustrating details of the blades on the wheel of FIG. 1;

Figure 5:
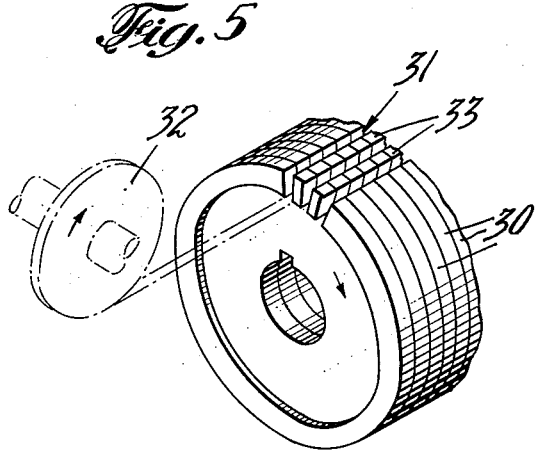
FIG. 5 is a perspective view representing a step in the method of making the turbine wheel.

The turbine wheel illustrated in FIGURES 1, 2, 3 and 4 comprises a pair of annuli, namely, a hub annulus 10 and a ring annulus 11 arranged in face to face contact and each having a plurality of projecting blades 10a and 10b extending radially outwardly and laterally across the other annulus. The projecting blades on one annulus are disposed alternately with the projecting blades on the other annulus. As illustrated in the drawings, hub annulus 10 and ring annulus 11 are secured together to prevent relative movement therebetween by means of a plurality of individual spots of weld metal 12 spaced interiorly of the blades and about the axis of rotation.

Hub annulus 10 is machined from a single piece of material so that it has a hub portion 13 mountable on any suitable shaft, for example, shaft 14 illustrated in FIGURES 1 and 2, a disc portion 15, and blade supporting portion 16 which is next adjacent the blades 10a. Disc portion 15 is narrower than hub portion 13, encircles hub portion 13 and is provided with a face 17 on one side thereof. The face 17 is disposed substantially between the opposite axial ends of hub portion 13 and extends from hub portion 13 to the blades 10a.

Ring annulus 11 is machined from a single piece of material having a hub portion 20 mountable on the hub portion 13 of hub annulus 10. A disc portion 21 and a blade supporting portion 22 of the annulus 11 extend outwardly from the hub portion 20 to the blades 10b. Disc portion 21 is thinner than hub portion 20, encircles hub portion 20 and is provided with a face 23 on one side thereof. The face 23 extends from hub portion 20 toward the blades 10a and abuts against face 17 of annulus 10.

In the present embodiment the blades 10a and 10b are identical in size, shape and configuration. Each of the blades 10a includes a base 25 integrally joining the blade to the supporting portion 16. Likewise, each projecting blade 10b includes a base portion 26 integrally joining the blade to the supporting portion 22. As illustrated in FIG. 4 each projecting blade 10a and its respective base extends laterally from the supporting portion 16 and towards the supporting portion 22 and each projecting blade 10b and its respective base portion 26 extends laterally from the supporting portion 22 and towards the supporting portion 16. Since projecting blades 10a and 10b, together with their bases 25 and 26, are substantially identical in conformation, and the spaces between the bases are each substantially the same in width as the width of each base, the blades are thus alignable by intermeshing their bases so that each base on one annulus engages and is substantially keyed between adjacent bases on the other annulus when the annuli are assembled. Thus, sufficient space is provided between the blades on each annulus to permit complete machining of each and all of the individual blades prior to the assembling of hub annulus 10 and ring annulus 11.

Figure 6:
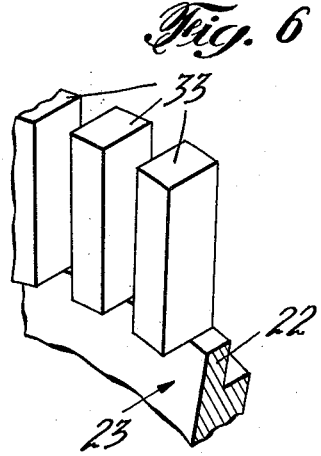
FIG. 6 is an enlarged fragmentary view of the blades upon completion of an intermediate step in the method of manufacture.
Figure 7:
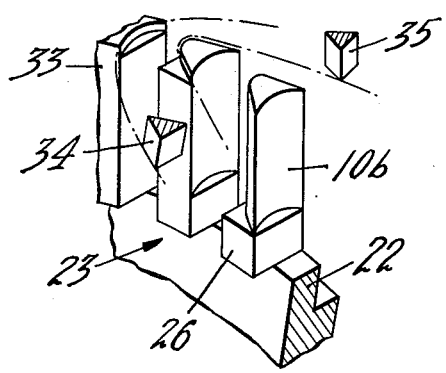
FIG. 7 is an enlarged fragmentary view illustrating the machining of the blades.

FIGURES 5, 6 and 7 illustrate steps in the method of manufacturing one of the pair of annuli with the blades integral therewith. Each of the pair of annuli is manufactured by this same basic method and then the annuli are assembled together to form the unitary structure of the turbine wheel as illustrated in FIGURES 1 and 2. As illustrated in FIG. 5 a mass production step in forming the annuli may be effected by assembling a plurality of blanks 30 in axial alignment and then cutting radial slots 31 axially of the blanks 30 with a tool, illustrated in phantom at 32. The cutting of these slots 31 at equispaced intervals about the circumference of the blanks 30 provides projections 33 such as those illustrated in FIG. 6. It is noted that these projections 33 extend radially and laterally from the periphery of the disc part of the annulus and are spaced apart by substantially twice the spacing between the blades on the completed wheel. This double spacing provides sufficient space as illustrated in FIG. 7 for tools 34 and 35 to be manipulated by suitable machines to transform the projections 33 into the individual blades 10a or 10b with each blade having the desired polished and finished surface contours. Faces 17 and 23 are also machined.

After blanks 30 have thus been machined into the annuli 10 and 11 they are assembled with faces 17 and 23 in contact as illustrated in FIG. 2. Blades 10a are positioned between blades 10b. The spacing between adjacent blades 10a and 10b is preferably accurately maintained by the intermeshing or interlocking of the bases 25 and 26 or, in instances where extremely low torque is involved, it may be keyed by a suitable alignment pin 36 mounted in the hub portion 13 and slot 37 in the ring annulus. However, the alignment pin usually serves merely to asure desired relative positions of the annuli at assembly. Thereafter the annuli 10 and 11 are permanently secured to each other by any suitable means such as for example by welds 12 to form the completed wheel.

Figure 8:
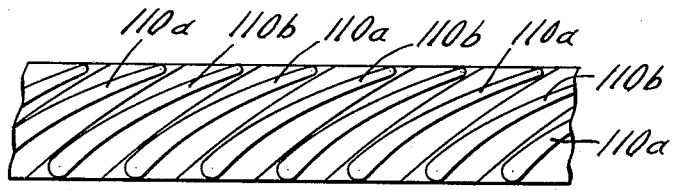
FIG. 8 is an enlarged fragmentary plan view of a modification of the invention.
Figure 9:
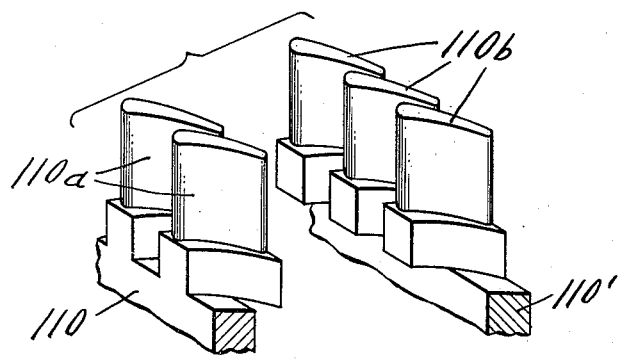
FIG. 9 is an enlarged fragmentary exploded view of a modification of the invention.

In FIG. 8 there is illustrated a fragmentary view of a modification of the invention. In this modification a pair of annuli, each having blades, is constructed in accordance with the method as described in connection with FIGURES 5, 6 and 7 with the difference being that to obtain the structure of FIG. 8, the slots are made helically about the blanks instead of axially of the blanks. Thus in FIG. 8 the blade projections 110a are on one annulus 110 and the blade projections 110b are on another annulus 110'.

Figure 10:
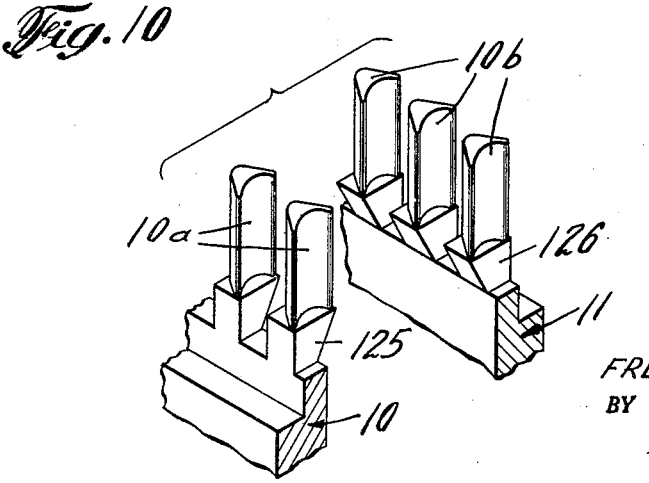
FIG. 10 is an enlarged fragmentary exploded view of another modification of the invention.

FIG. 10 illustrates a modification of the blades of FIG. 4 wherein the blade base portions 125 and 126 are chamfered.

It is apparent that the objects of the present invention have been met by the herein described method of constructing a turbine wheel which has a pair of annuli secured in face to face contact with each annulus having a plurality of blades extending radially outwardly and laterally across the other annulus. Each annulus is machined from a single integral piece of material by the steps of forming projections or blades around the periphery of each annulus while it is separate and independent of the other anulus and thereafter positioning the annuli in face to face contact with the blades of each annulus positioned between the blades of the other annulus and finally securing the annulus together. In this way a turbine wheel may easily be constructed while providing sufficient working space between the individual blades with the finished wheel having twice as many blades as the individual parts of that finished wheel.

It is thought that the invention and many of its attendant advantages will be understood from the foregoing description and it will be apparent that various changes may be made in the form, construction, and arrangement of the parts without departing from the spirit and scope of the invention or sacrificing all of its material advantages, the form hereinbefore described being merely a preferred embodiment thereof.

I claim:

1. A rotor comprising a pair of axially aligned annuli, a plurality of working members spaced substantially equidistantly and radiating outwardly around the periphery of the rotor, said members being united alternately to said annuli and extending laterally therefrom and each member comprising a radially outer working element and a radially inner base portion, the latter having its laterally extending portion substantially the counterpart of and thus substantially filling a space betwen adjacent base portions thereby to substantially integrate said base portions of the working members throughout the periphery of the rotor.

2. The combination of claim 1 wherein said base portions are helically disposed on said annuli.

3. The combination of claim 1 wherein said rotor is a turbine wheel and said working elements are the blades thereon.

4. The combination of claim 1 wherein said annuli are secured one to the other radially inwardly of said working members.

5. The method of making a rotor comprising a pair of annuli each having a plurality of working members radiating outwardly around its periphery, each of said annuli being formed from a disc blank having a peripheral flange extending laterally from a side of the disc, said method comprising the steps of stacking a plurality of said blanks in axial alignment, cutting slots axially through said flanges of the stacked discs to produce a series of radiating members each substantially the counterpart of the resulting space between adjacent radiating members, shaping into a working element a radially outer portion of each of said members to a predetermined depth less than the length of the member thus leaving an inner portion of each member to serve as a base for the element, aligning paired annuli with said slotted laterally extending portion of the peripheral flanges in opposition and with the base of each of said elements on one annulus in alignment with a said slot between bases on the other annulus, moving the annuli axially into assembled position with the laterally projecting bases of said elements on one annulus substantially filling the space between the bases on the other annulus, and securing said annuli one to the other.

6. The method of claim 5 wherein said slots are cut helically through said flanges of the stacked discs and said movement of the annuli into assembled position in a combined axial and rotational movement.

References Cited in the file of this patent

UNITED STATES PATENTS

| | | |
|---|---|---|
| 638,277 | Rigdon | Dec. 5, 1899 |
| 809,277 | Barker | Jan. 9, 1906 |
| 1,142,690 | Francke | June 8, 1915 |
| 1,724,604 | Lambert | Aug. 13, 1929 |
| 2,633,776 | Schenk | Apr. 7, 1953 |
| 2,704,395 | Heidegger | Mar. 22, 1955 |
| 2,958,459 | Newton et al. | Nov. 1, 1960 |

FOREIGN PATENTS

| | | |
|---|---|---|
| 997,656 | France | Sept. 12, 1951 |